(12) United States Patent
Holly et al.

(10) Patent No.: US 9,605,514 B2
(45) Date of Patent: Mar. 28, 2017

(54) USING DYNAMIC UNDERBALANCE TO INCREASE WELL PRODUCTIVITY

(71) Applicant: Halliburton Energy Services, Inc., Houston, TX (US)

(72) Inventors: Mark S. Holly, Houston, TX (US); Wei Zhang, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 302 days.

(21) Appl. No.: 14/380,727

(22) PCT Filed: Oct. 22, 2013

(86) PCT No.: PCT/US2013/066055
§ 371 (c)(1),
(2) Date: Aug. 25, 2014

(87) PCT Pub. No.: WO2015/060818
PCT Pub. Date: Apr. 30, 2015

(65) Prior Publication Data
US 2016/0265312 A1    Sep. 15, 2016

(51) Int. Cl.
| E21B 37/08 | (2006.01) |
| E21B 37/10 | (2006.01) |
| E21B 33/12 | (2006.01) |
| G05D 7/06 | (2006.01) |
| E21B 47/06 | (2012.01) |

(52) U.S. Cl.
CPC .............. *E21B 37/08* (2013.01); *E21B 33/12* (2013.01); *E21B 37/10* (2013.01); *G05D 7/0676* (2013.01); *E21B 47/06* (2013.01)

(58) Field of Classification Search
CPC ...... E21B 43/116; E21B 43/119; E21B 27/02; E21B 37/00; E21B 37/04; E21B 41/00; E21B 34/14; E21B 37/10; E21B 37/08; E21B 33/12; E21B 47/06; G05D 7/0676
See application file for complete search history.

(56) References Cited

U.S. PATENT DOCUMENTS 3,589,442 A * 6/1971 Kilgore .................. E21B 37/08
166/299
4,161,985 A    7/1979 Fournier et al.
(Continued)

FOREIGN PATENT DOCUMENTS

| WO | 2009153560 A2 | 12/2009 |
| WO | 2013073948 A1 | 5/2013 |

OTHER PUBLICATIONS

International Search Report and Written Opinion for PCT/US2013/066055 dated Jul. 10, 2014.

*Primary Examiner* — Yong-Suk (Philip) Ro
(74) *Attorney, Agent, or Firm* — McDermott Will & Emery LLP (57) ABSTRACT

An underbalance pressure generator includes a housing having a first end and a second end and defines a piston chamber that extends between the first and second ends. A piston is movably arranged within the piston chamber, and one or more influx ports are defined in the housing at or near the second to enable fluid communication between the piston chamber and an exterior of the housing. A locking mechanism is arranged at or near the second end and capable of securing the piston at or near the second end.

19 Claims, 3 Drawing Sheets

(56) References Cited

U.S. PATENT DOCUMENTS

| | | | |
|---|---|---|---|
| 4,721,156 A | | 1/1988 | Campbell |
| 5,135,050 A | * | 8/1992 | Tailby .................... E21B 27/00 166/311 |
| 8,757,272 B2 | * | 6/2014 | Couturier ............. E21B 21/106 166/373 |
| 9,328,580 B2 | * | 5/2016 | Tinnen ................... E21B 27/00 |
| 2009/0139728 A1 | * | 6/2009 | Schrader ................ E21B 34/10 166/373 |
| 2010/0155054 A1 | | 6/2010 | Innes et al. |
| 2011/0315400 A1 | | 12/2011 | Zweifel |
| 2012/0298376 A1 | | 11/2012 | Twardowski |
| 2013/0087324 A1 | | 4/2013 | Moeller et al. |

* cited by examiner

USING DYNAMIC UNDERBALANCE TO INCREASE WELL PRODUCTIVITY

This application is a National Stage entry of and claims priority to International Application No. PCT/US2013/066055, filed on Oct. 22, 2013.

BACKGROUND

The present disclosure relates to wellbore operations, and more particularly, using dynamic underbalancing by non-explosive means to increase fluid flow within a wellbore.

After drilling the various sections of a subterranean wellbore that traverses a hydrocarbon-bearing formation, a well operator may undertake perforation operations to increase productivity in one or more sections of the wellbore. However, this increased productivity may slow over a period of time due to the perforation channels being obstructed, for example, by sand, wax, scale, and other debris. The period of time and the degree of reduced productivity may vary depending on factors such as the formation type, type of oil being produced from the formation, and the type of perforation job initially performed.

There are currently many ways to treat a well in attempting to counteract perforation channel obstructions and thereby increase productivity from the formation. For instance, a well may be acidized, additional fracturing may be performed, or the area may be re-perforated. With a re-perforation job in particular, some techniques implement explosives combined with dynamic underbalancing in attempting to clear the debris out of the perforation channels. The dynamic underbalancing technique generates a pressure differential, wherein the pressure within the wellbore is significantly lower than the pressure in the formation outside the wellbore. Thus, upon detonating one or more explosives adjacent the wellbore, a rapid decompression occurs and debris within perforation channels defined in the formation is drawn back through the wellbore walls and into the annulus or work string, thereby cleaning out the perforation channels.

This process, however, is inherently dangerous due to the need to use explosives. Beyond danger to human lives, the use of explosives creates a storage problem around the rig site. Moreover, the process is limited in efficiency due to single use operations of the explosives. Also, the size of the explosives required oftentimes presents a problem; too many explosives may damage the well, and not enough explosives may not adequately complete the job needed. Workarounds may include requiring additional perforation guns, explosives, or downhole deployment and retrieval of such tools.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure relates to wellbore operations, and more particularly, using dynamic underbalancing by non-explosive means to increase fluid flow within a wellbore.

The present disclosure provides improved systems and methods for increasing fluid flow within a wellbore using dynamic underbalancing techniques. In one embodiment, an underbalance pressure generator device having a piston chamber is conveyed downhole to a predetermined location and actuated, thus creating an influx of scale and debris from the formation and perforation channels into the wellbore and piston chamber. A distinguishing feature of the underbalance pressure generator device is the lack of need for explosives, thus safer to store on the drill rig. Additionally, the piston chamber can be reset and the operation/action can be performed again numerous times while downhole.

Another distinguishing feature is control of the underbalanced pressure within the piston chamber, thus controlling the underbalanced reaction and forces acting on the formation. Furthermore, one of skill in the art will appreciate that numerous piston chambers may be included in a single tool string and actuated independently, simultaneously, or in a variety of timing sequences. Additional tools, such as one or more packers surrounding the underbalance pressure generator device and isolating a zone of interest, may also be included in the tool string to increase efficiency when actuating the one or more piston devices.

Figure 1:
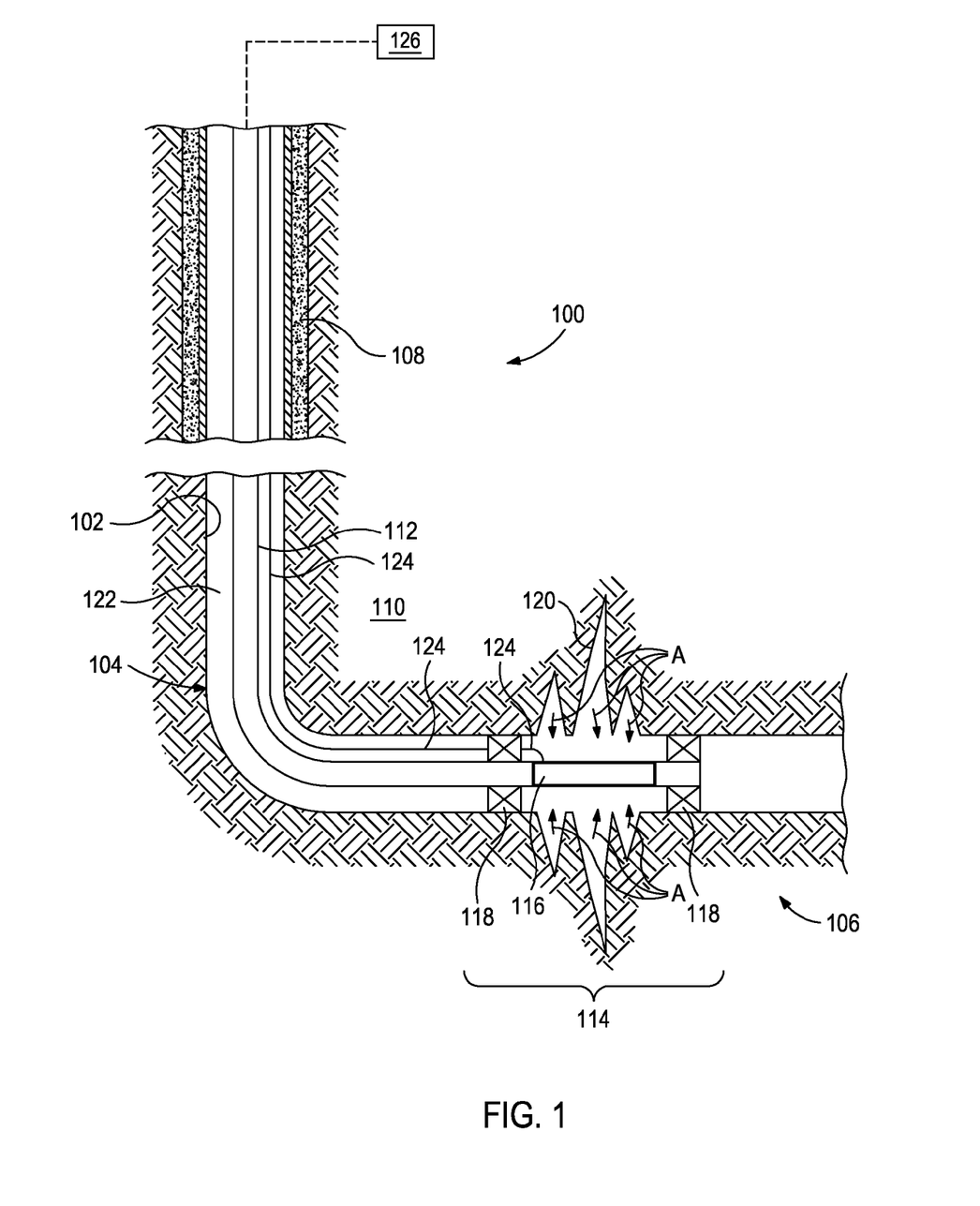
FIG. 1 illustrates a well system that may embody or otherwise employ one or more principles of the present disclosure, according to one or more embodiments.

Referring to FIG. 1, illustrated is an exemplary well system 100 that can embody or otherwise employ one or more principles of the present disclosure, according to one or more embodiments. As depicted, the well system 100 includes a wellbore 102 that extends through various earth strata and has a substantially vertical section 104 that transitions into a substantially horizontal section 106. The upper portion of the vertical section 104 may have a liner or casing string 108 cemented therein, and the horizontal section 106 may extend through a hydrocarbon bearing subterranean formation 110. As illustrated, the horizontal section 106 may be an open hole section of the wellbore 102. In other embodiments, however, the horizontal section 106 of the wellbore 102 may be completed, without departing from the scope of the disclosure.

The system 100 may further include a tool string 114 coupled or otherwise attached to a conveyance 112 that extends from the surface (not shown). The conveyance 112 may be, but is not limited to, drill pipe, production tubing, wireline, slickline, an electric line, coiled tubing, combinations thereof, and the like. In some embodiments, the tool string 114 may be pumped downhole to a target location within the wellbore 102 using hydraulic pressure applied from the surface. In other embodiments, the tool string 114 may be conveyed to the target location using gravitational or otherwise natural forces.

The tool string 114 may include or otherwise provide one or more downhole tools, such as an underbalance pressure generator device 116 (hereafter "the device 116"). As will be described in greater detail below, the device 116 is capable of generating a dynamic underbalance used to remove sand, wax, scale, and/or other debris from one or more perforation channels 120 defined in the walls of the wellbore 102 and extending into the subterranean formation 110. In some embodiments, the tool string 114 may include additional downhole tools, such as packers 118 or other types of wellbore isolation devices that may provide a fluid seal between the tool string 114 and the wellbore 102, thereby defining corresponding production intervals between axially adjacent packers 118. Moreover, the device 116 may be positioned between the packers 118. While only two downhole tools 116,118 are shown, those skilled in the art will readily appreciate that additional downhole tools 116,118 may be included in the tool string 114.

A control line 124 may extend from a drill rig (not shown) at the surface to the device 116. As depicted, the control line 124 may extend downhole within an annulus 122 defined between the inner wall of the wellbore 102 and the conveyance 112 and, in at least one embodiment, may extend through one of the packers 118 to access the device 116 and otherwise provide surface communication thereto. In other embodiments, however, the control line 124 may extend within the conveyance 112. While only one control line 124 is depicted, numerous control lines for varying purposes are contemplated in the present disclosure. For instance, the control line 124 may be representative of or otherwise include one or more hydraulic lines, one or more electrical lines, and/or one or more fiber optic lines that extend from the surface to the tool string 114.

In exemplary operation, the device 116 may be advanced into the wellbore 102 to a target location where increased hydrocarbon productivity is desired, such as around the pre-made perforation channels 120. The device 116 may then be actuated or otherwise activated in order to generate a pressure underbalance within the annulus 122 surrounding the device 116. In some embodiments, the device 116 may be actuated from the surface, such as via one or more commands sent to the device 116 via a computer 126 arranged at the surface location. In other embodiments, however, the device 116 may be actuated using downhole equipment, as will be described in greater detail below.

Upon generating the pressure underbalance in the annulus 122, debris and scale that may be present within the perforation channels 120 may be dislodged and otherwise drawn into the annulus 122 as depicted by the arrows A, thereby clearing (or substantially clearing) the perforation channels 120 of such debris and scale. In one embodiment, some or all of the debris and scale may be returned to the surface via the annulus 122 under pressure after the tool string 114 is pulled back uphole. In other embodiments, a portion of the debris and scale may be drawn or otherwise flow into the device 116 and returned to the surface when the tool string 114 is removed from the wellbore 102.

The computer 126 may include a processor and a machine-readable storage medium having instructions stored thereon, which, when executed, may perform operations in real-time or near real-time such as communicating and/or controlling the downhole tools. For instance, the computer 126 may operate the packers 118 and thereby define the production interval, or actuate the device 116 and thereby clear debris from the perforation channels 120. As discussed below, the computer 126 may be part of a broader neural network, enabling operation or monitoring from an offsite location.

Even though FIG. 1 depicts the tool string 114 as being arranged in a generally horizontal section 106 of the wellbore 102, those skilled in the art will readily recognize that the principles of the present disclosure are equally well suited for use in vertical wells, deviated wellbores, slanted wells, multilateral wells, combinations thereof, and the like. As used herein, directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

Figure 2:
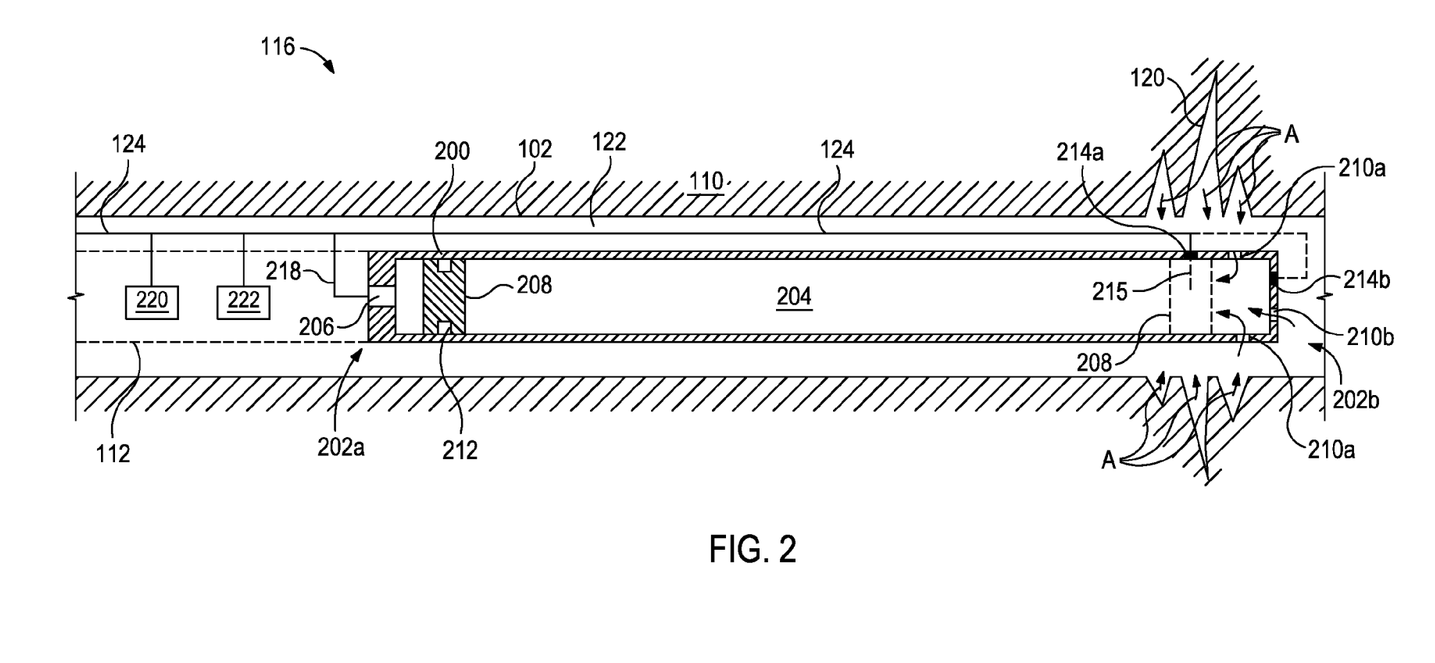
FIG. 2 illustrates an enlarged cross-sectional side view of the exemplary underbalance pressure generator device of FIG. 1, according to one or more embodiments.

Referring now to FIG. 2, illustrated is an enlarged cross-sectional side view of the exemplary underbalance pressure generator device 116 of FIG. 1, according to one or more embodiments. The device 116 may include a housing 200 having a proximal or first end 202a and a distal or second end 202b. In one embodiment, the housing 200 may be generally circular and define an implosion or piston chamber 204 therein that extends between the first and second ends 202a,b. A piston 208 may be movably arranged within the piston chamber 204.

The piston chamber 204 may include a hydraulic fluid port 206 at or near the first end 202a that enables fluid communication between the piston chamber 204 and a hydraulic fluid source (not shown) via a conduit 218 operatively coupled to the hydraulic fluid port 206. In one embodiment, the conduit 218 may be fluidly coupled to the control line 124 such that hydraulic fluid may be derived from the control line 124. In other embodiments, however, the hydraulic fluid may be derived from a fluid reservoir (not shown) located downhole or that otherwise forms an integral part of the tool string 114 (FIG. 1).

At or near the second end 202b, the housing 200 may further include or otherwise define one or more influx ports 210 (shown as one or more radial influx ports 210a and one or more axial influx ports 210b). The influx ports 210a,b may place the piston chamber 204 in fluid communication with the annulus 122 of the wellbore 102 surrounding the housing 200. More particularly, the influx ports 210a,b may enable fluid communication between the piston chamber 204 and the perforation channels 120 within the formation 110 (FIG. 1). While only three influx ports 210a,b are depicted in FIG. 2, embodiments are contemplated herein that include more or less than three influx ports 210a,b (including only one), without departing from the scope of the disclosure. Moreover, it is also contemplated herein to include only radial influx ports 210a or only axial influx ports 210b.

The piston 208 may be configured to sealingly engage the inner wall of the piston chamber 204 as it translates axially therein in response to changes in pressure experienced on either side of the piston 208. To accomplish this, the piston 208 may include or incorporate one or more dynamic seals 212. As used herein, the term "dynamic seal" is used to indicate a seal that provides pressure isolation between members that have relative displacement therebetween, for example, a seal that seals against a displacing surface, or a seal carried on one member and sealing against the other member, etc. The dynamic seal 212 may be made of a material selected from the following: elastomeric materials, non-elastomeric materials, metals, composites, rubbers, ceramics, derivatives thereof, and any combination thereof. In some embodiments, the dynamic seal 212 may be an O-ring or other type of elastomeric sealing element. In other embodiments, the dynamic seal 212 may be one or more packing seal rings, or the like. As will be appreciated, the dynamic seal 212 and the piston 208 may serve to isolate the hydraulic fluid that may be introduced into the piston chamber 204 at the first end 202a from any fluids, debris and/or scale that may be present in the piston chamber 204 at the second end 202b.

At or near the second end 202b of the housing 200, the device 116 may further include one or more locking mechanisms 214 (shown as a first locking mechanism 214a and a second locking mechanism 214b). As depicted, the first locking mechanism 214a may be operatively coupled to the housing 200 at or near the distal 202b and communicably coupled to the control line 124. In one embodiment, the first locking mechanism 214a may be an actuation device, such as a solenoid assembly that is configured to radially extend/retract a rod 215 into and/or out of the piston chamber 204. The rod 215 may be configured to interact with the piston 208 and axially secure the piston 208 in place when arranged at or near the second end 202b. As communicably coupled to the control line 124, the actuation device may be powered using hydraulics, pneumatics, or electricity and therefore may be a mechanical, electromechanical, hydraulic, or pneumatic actuation device.

In another embodiment, the first locking mechanism 214a may be or otherwise encompass one or more shearable devices, such as a shear ring or one or more shear pins. Similar to the actuation device, the shearable devices may be configured to interact with the piston 208 and otherwise secure the piston 208 in place when arranged at or near the second end 202b. Upon experiencing a predetermined axial force or pressure, the shearable device(s) may be configured to yield, and thereby free the piston 208 from engagement with the first locking mechanism 214a.

In one embodiment, similar to the first locking mechanism 214a, the second locking mechanism 214b may also be an actuation device configured to axially extend/retract a rod or armature into and/or out of the piston chamber 204 and thereby secure the piston 208 in place when arranged at or near the second end 202b. The second locking mechanism 214b may also be communicably coupled to the control line 124 such that the associated actuation device of the second locking mechanism 214b may be mechanical, electromechanical, hydraulic, pneumatic, or a combination thereof. In another embodiment, the second locking mechanism 214b may be a magnet or magnetic assembly configured to magnetically attract the piston 208 (or a ferrous portion thereof) when it is arranged at or near the second end 202b. In such embodiments, the magnetic assembly may be an electromagnet that can be operated or otherwise controlled via the control line 124.

The device 116 may further include one or more sensors 220 and a control module 222, each being communicably coupled to the control line 124. The sensor 220 may be a pressure sensor 220 that enables a well operator to correlate downhole pressures with wellbore depth. In another embodiment, the sensor 220 may be a casing collar locator also used to provide the well operator with wellbore depth readings. The sensor 220 may be able to communicate with the computer 126 (FIG. 1) or an operator at the surface via the control line 124. The control module 222 may be configured to provide the well operator with real-time downhole information, such as one or more parameters or conditions sensed by the sensor 220. In some embodiments, the control module 222 may additionally receive control signals from the computer 126 to operate the device 116, such as control signals used to operate the locking mechanisms 214a,b and controlling a flow of hydraulic fluid into and out of the piston chamber 204 via the hydraulic fluid port 206 and associated conduit 218. Accordingly, the first and second locking mechanisms 214a,b and the hydraulic input via the hydraulic fluid port 206 may either be controlled directly from the surface (e.g., the computer 126) or otherwise through the control module 222.

In exemplary operation, the device 116 may be advanced into the wellbore 102 to a target location, such as at or near the perforation channels 120. Hydraulic fluid may then be introduced or otherwise conveyed into the piston chamber 204 via the hydraulic fluid port 206 and associated conduit 218. The hydraulic fluid may act on the piston 208, thereby moving the piston 208 towards the second end 202b of the device 116. Once at the second end 202b, the piston 208 (now shown in phantom) may be locked or otherwise secured in place within the piston chamber 204 using the one or more locking mechanisms 214a,b. Once the piston 208 is secured in place, the hydraulic fluid may then be removed or evacuated from the hydraulic chamber 204 via the hydraulic fluid port 206 and associated conduit 218, thereby creating a low-pressure area within the piston chamber 204 and a pressure differential between the piston chamber 204 and the annulus 122 surrounding the device 116. With the piston 208 secured in place at or near the second end 202b and a pressure differential generated within the piston chamber 204, the device 116 may be considered to be in a first or charged configuration.

As will be appreciated, the device 116 may be placed in the first configuration prior to deployment downhole. In other words, for example, the hydraulic fluid may be introduced into the hydraulic chamber 204 and the piston 208 may be axially secured at or near the second end 202b of the housing 200 with the first and/or second locking mechanisms 214a,b prior to running the device 116 into the wellbore 102.

Once at the target location downhole, the device 116 may be actuated, for example, by the well operator inputting a command to the computer 126 (FIG. 1). Alternatively, the device 116 may be actuated at a predetermined time via a timer implemented by or within the computer 126 or the command module 222. In a further embodiment, the device 116 may be configured to actuate once a predetermined pressure limit is sensed or otherwise detected by the sensor 220. Upon actuation, the locking mechanism 214a,b may be configured to release the piston 208, whereby the piston 208 is moved towards the first end 202a as the piston chamber 204 seeks pressure equilibrium. As the piston 208 moves from the second end 202b towards the first end 202a, wellbore fluids within the annulus 122 are drawn into the piston chamber 204 via the influx ports 210a,b, thereby generating a pressure underbalance within the annulus 122 surrounding the device 116. The pressure underbalance may serve to draw scale and debris out from the perforation channels 120 and into/toward the annulus 122, as represented by the arrows A. Some of the scale and/or debris may enter the piston chamber 204 via influx ports 210a,b.

Advantageously, the device 116 may be reset or placed in the charged configuration again, and the process may be repeated multiple times while the device 116 remains downhole. For instance, the well operator may determine that repetitions may be required based on parameters or readings returned by the sensor(s) 220. For example, the sensor(s) 220 may be configured to monitor pressure within the annulus 122 before and after operation of the device 116. When compared to a time-based pressure test performed prior to operation of the device 116, a decreased time required for the pressure to return to prior levels or above after operation of the device 116 may be an indication of fluid flow increase from the formation 110, which may translate into how much debris and/or scale has been removed from the perforations 120.

It should be appreciated that additional mechanisms and/or devices may be incorporated into the device 116 in order to enable operation as generally described above. For example, the device 116 may include one or more diaphragms (not shown). The diaphragm(s) may be arranged at or near the distal end 202b of the piston chamber 204 and prevent fluid communication between the piston 208 and the annulus 122. In some embodiments, the diaphragm(s) may be arranged within one or more of the influx ports 210a,b. In other embodiments, a diaphragm may be arranged within the piston chamber 204 and generally seal about its outer circumference in order to prevent fluid communication between the piston 208 and the annulus 122. Various methods may be used to puncture or otherwise penetrate the diaphragm(s) and thereby enable fluid communication between the piston 208 and the wellbore 102. For instance, the diaphragm(s) may be punctured using a mechanical or electromechanical device, such as a pin pushing device that penetrates the diaphragm(s). Moreover, the diaphragm(s) may work in conjunction with one or more of the locking mechanisms 214a,b such that puncturing the diaphragm(s) may coincide with releasing the piston 208, thereby enabling the piston 208 to seek pressure equilibrium within the piston chamber 204 while fluids are simultaneously drawn therein via the influx ports 210a,b.

Similarly, the device 116 may incorporate one or more actuatable valves or check valves (not shown) capable of allowing or preventing fluid communication between the piston 208 and the annulus 122 until desired. The actuatable valve(s) may be arranged within the piston chamber 204 at or near the distal end 202b and communicably coupled to the control line 124 such that the actuatable valves may be actuated upon command. Check valves may be arranged within each of the influx ports 210a,b and may be able to allow fluid flow therethrough upon experiencing a pressure threshold, such as when the piston 208 is released from the locking mechanisms 214a,b. In any event, the valve(s) may be configurable in a first state to prevent fluid communication, and in a second state to enable fluid communication between the piston 208 and the annulus 122.

Figure 3:
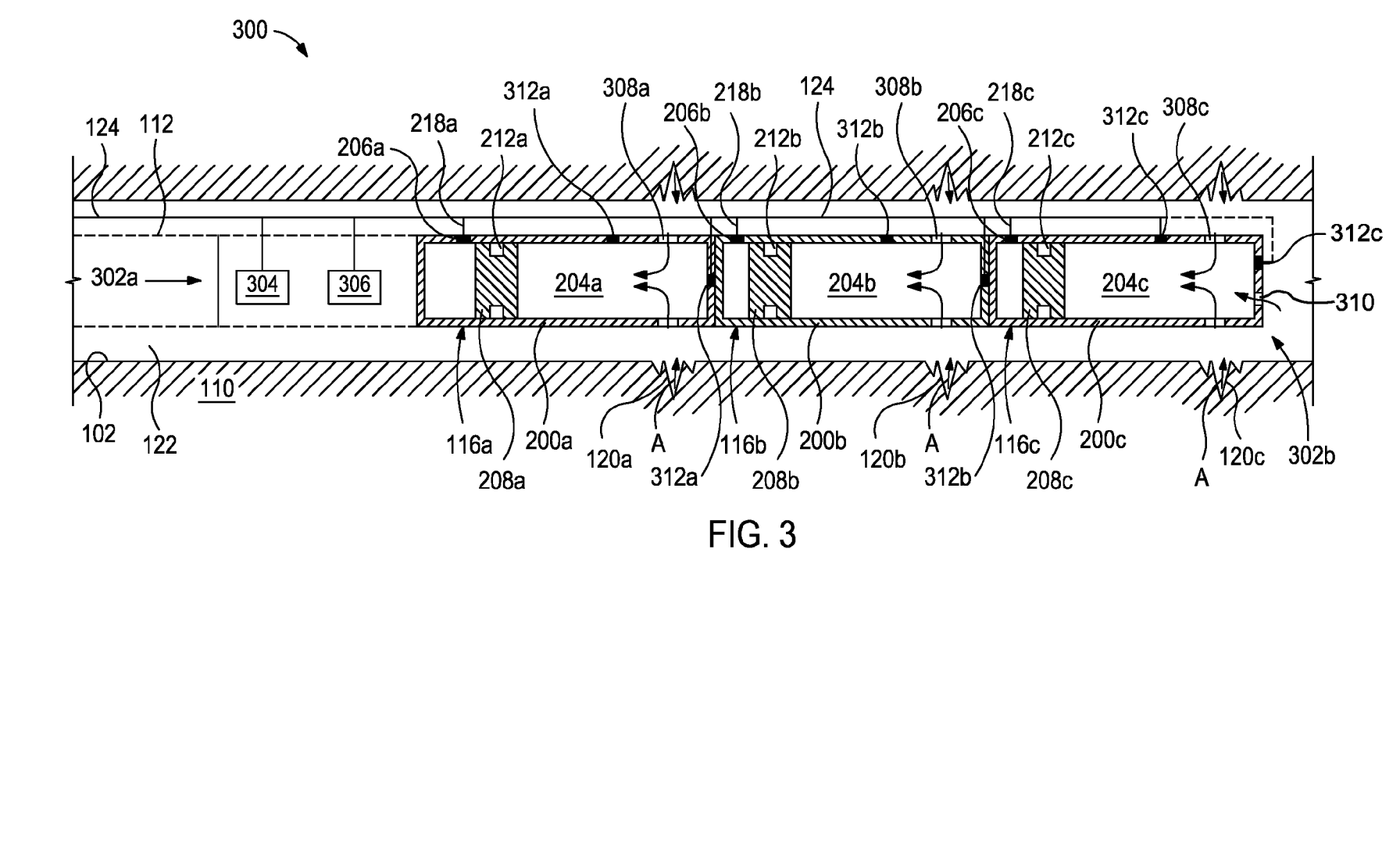
FIG. 3 illustrates a cross-sectional view of a tool string, according to one or more embodiments.

Referring now to FIG. 3, with continued reference to FIGS. 1 and 2, illustrated is a cross-sectional view of a tool string 300, according to one or more embodiments. The tool string 300 may be similar to the tool string 114 of FIG. 1, but may instead include two or more underbalance pressure generator devices 116 (shown as a first device 116a, a second device 116b, and a third device 116c) arranged in an axially coupled relationship. As will be appreciated, the tool string 300 may have more than three devices 116a-c, or only two, without departing from the scope of the disclosure. As illustrated, the first device 116a may be arranged at an uphole end 302a of the tool string 300, the third device 116c may be arranged at a downhole end 302b of the tool string 300, and the second device 116b may interpose the first and second devices 116a,c. Each device 116a-c may include a separate housing 200, shown as housings 200a-c, respectively, and each housing 200a-c may further include individual piston chambers 204 (shown as piston chambers 204a-c) and pistons 208 (shown as pistons 208a-c) movably arranged therein.

Axially adjacent devices 116a-c may be operatively coupled to each other. In some embodiments, for example, axially adjacent devices 116a-c may be threadably coupled to each other at opposing axial ends. In other embodiments, however, axially adjacent devices 116a-c may be mechanically fastened to each other at opposing axial ends using one or more mechanical fasteners including, but not limited to, bolts, screws, snap rings, pins, combinations thereof, and the like.

Each device 116a-c may vary in size and/or length, thereby enabling a configuration of increased efficiency during downhole operations. For example, an axially longer housing 200a-c and/or piston chamber 204a-c may allow a greater pressure underbalance and piston stroke during operation, thus having a larger impact on a targeted section of the perforation channels 120 (shown in FIG. 3 as perforation channels 120a, 120b, and 120c). However, an axially shorter housing 200a-c and/or piston chamber 204a-c may act more evenly on the perforation channels 120a-c, thus decreasing the likelihood of unwanted damage to the wellbore 102 or perforation channels 120a-c.

One of skill in the art will appreciate that the devices 116a-c included in the tool string 300 are not necessarily drawn to scale. More particularly, the associated housings 200a-c, pistons 208a-c, and piston chamber 204a-c of each device 116a-c need not be equal in length. Moreover, the tool string 300 may include more or less than three devices 116a-c, and may further include sections of blank pipe (not shown) or other tools interposing the devices 116a-c, without departing from the scope of the disclosure.

The tool string 300 may be communicably coupled to the control line 124 extending from the surface, which may further be communicably coupled independently to each of the devices 116a-c. For example, the first housing 200a may include a first hydraulic fluid port 206a fluidly coupled to the control line 124 via a first conduit 218a, the second housing 200b may include a second hydraulic fluid port 206b fluidly coupled to the control line 124 via a second conduit 218b, and the third housing 200c may include a third hydraulic fluid port 206c fluidly coupled to the control line 124 via a third conduit 218c. Similar to the hydraulic fluid port 206 and associated conduit 218 of FIG. 2, the fluid ports 206a-c and associated conduits 218a-c may enable fluid communication between the piston chamber 204 and a hydraulic fluid source (not shown).

Each device 116a-c may further include one or more radial influx ports 308 (shown as radial influx ports 308a, 308b, and 308c) similar to the radial influx ports 210a of FIG. 2. Each radial influx port 308a-c may be arranged at or near the downhole end of each housing 200a-c, respectively, and enabling fluid communication between the associated piston chamber 204a-c and the annulus 122. The third device 116c located at the second end 302b of the tool string 300 may additionally include an axial influx port 310 at its distal end.

The pistons 208a-c within each piston chamber 204a-c may be configured to sealingly engage the inner wall of the respective piston chambers 204a-c as they translate axially therein in response to changes in pressure experienced on either side of the pistons 208a-c. To accomplish this, each piston 208a-c may include or incorporate an associated dynamic seal 212a-c, such as described above and capable of performing accordingly.

Moreover, each piston 208a-c may interact with one or more locking mechanisms 312 (shown as locking mechanisms 312a, 312b, and 312c) arranged at or near the distal end of each housing 200a-c, respectively. The locking mechanisms 312a-c may be substantially similar to the one or more locking mechanisms 214a,b of FIG. 2, and therefore will not be described again in detail. As illustrated, the locking mechanism 312a-c may be communicably coupled to and controlled by the control line 124.

The tool string 300 may further include a sensor 304 and a control module 306 communicably coupled to the control line 124 and capable of communication with the computer 126 (FIG. 1) or an operator at the surface. The sensor 304 and the control module 306 may be similar to the sensor 220 and the control module 222 of FIG. 2, and therefore will not be described in detail again.

In exemplary operation, the tool string 300 may be advanced into the wellbore 102 to a target location, such as at or near the perforation channels 120a-c. Each device 116a-c may be placed into a charged configuration, as previously described, by introducing hydraulic fluid into the respective piston chambers 204a-c, thus acting to move the associated pistons 208a-c to the distal end of each piston chamber 204a-c. Upon reaching the distal end of each piston chamber 204a-c, each piston 208a-c may be secured in place using the one or more locking mechanisms 312a-c, respectively, after which the hydraulic fluid may then be evacuated out of each housing 200a-c. It should be appreciated that the pressure differential between each piston chamber 204a-c and the surrounding annulus 122 (or perforation channels 120a-c) may be, but need not be equal. For example, the first device 116a may be configured to have a first pressure differential between the first piston chamber 204a and the first perforation channel 120a, and the second device 116b may be configured to have a second pressure differential between the second piston chamber 204b and the second perforation channel 120b.

Once the pressure differentials are generated, one or more of the devices 116a-c may be actuated, for example, by the well operator inputting a command to the computer 126 (FIG. 1), which may further interact with the control module 306 and the sensor 304. Alternatively, the control module 306 may work in conjunction with the sensor 304 and/or the sensor 220 (FIG. 2) of each device 116a-c to dictate actuation timing of the devices 116a-c. In one embodiment, the devices 116a-c may each be actuated simultaneously. In another embodiment, one or more of the devices 116a-c may be actuated following a time delay after actuation of one of the devices 116a-c. For example, the first device 116a may be actuated prior to actuating the second device 116b, and the second device 116b may be actuated prior to actuating the third device 116c.

Upon actuation of each device 116a-c, the corresponding pistons 208a-c are rapidly moved towards the proximal end of each device 116a-c as the piston chamber 204a-c seeks equilibrium, thereby drawing fluids within the annulus 122 through the influx ports 308a-c, 310 and generating a pressure underbalance in the surrounding area of the annulus 122. The pressure underbalance within the annulus 122 may correspondingly draw scale and debris out from any or all of perforation channels 120a-c, but in particular, from the surrounding perforation channels 120a-c closest to the actuated device 116a-c. For example, actuation of the first device 116a may generally draw scale and debris from the first perforation channel 120a and actuation of the second device 116b may generally act to draw scale and debris from the second perforation channels 120b. Advantageously, a well operator may increase downhole operation efficiency by altering the design parameters or configuration of the devices 116a-c and their respective times of actuation, and thereby altering the resulting pressure underbalances.

While not illustrated, it will be appreciated that the tool string 300 may be generally arranged between an adjacent pair of wellbore isolation devices, such as the packers 118 of FIG. 1. Such wellbore isolation devices may be capable of providing a fluid seal between the tool string 300 and the wellbore 102, thereby defining a corresponding production interval. In some embodiments, each wellbore isolation device may be communicably coupled to the control line 124 and/or the computer 126. Additional sensor(s) similar to the sensor(s) 220, 304, and control module(s) similar to the control module(s) 222, 306 may be further included in the tool string 300 at locations outside of the production interval. In some embodiments, wellbore isolation devices may isolate each device 116a-c from each other, thus enabling multiple production intervals corresponding to each device 116a-c. Advantageously, due to the isolated volume of fluid within the production interval(s), the underbalance generated by each device 116a-c within the production interval(s) may have a larger impact on the perforation channels 120a-c therein and may act to remove a greater quantity of scale and debris from the perforation channels 120a-c than would otherwise be removed without the isolated zone(s).

It is recognized that the various embodiments herein, such as those including the computer 126 and the control modules 222, 306, may be directed to computer control and artificial neural networks, including various blocks, modules, elements, components, methods, and algorithms, and can be implemented using computer hardware, software, combinations thereof, and the like. To illustrate this interchangeability of hardware and software, various illustrative blocks, modules, elements, components, methods and algorithms have been described generally in terms of their functionality. Whether such functionality is implemented as hardware or software will depend upon the particular application and any imposed design constraints. For at least this reason, it is to be recognized that one of ordinary skill in the art can implement the described functionality in a variety of ways for a particular application. Further, various components and blocks can be arranged in a different order or partitioned differently, for example, without departing from the scope of the embodiments expressly described.

Computer hardware used to implement the various illustrative blocks, modules, elements, components, methods, and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), erasable read only memory (EPROM)), registers, hard disks, removable disks, CD-ROMs, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Embodiments disclosed herein include:

A. An underbalance pressure generator device that includes a housing having a first end and a second end and defining a piston chamber that extends between the first and second ends, a piston movably arranged within the piston chamber, one or more influx ports defined in the housing at or near the second end and configured to enable fluid communication between the piston chamber and an exterior of the housing, and a locking mechanism arranged at or near the second end and capable of securing the piston at or near the second end.

B. A system that includes a wellbore drilled into a subterranean formation and having one or more perforation channels defined therein, at least one underbalance pressure generator device extendable into the wellbore and comprising a housing defining a piston chamber that extends between a first end and a second end of the housing and a piston movably arranged within the piston chamber, wherein one or more influx ports are defined in the housing at or near the second end and configured to enable fluid communication between the piston chamber and an exterior of the housing, and a locking mechanism arranged at or near the second end of the housing and capable of securing the piston at or near the second end.

C. A method of conveying an underbalance pressure generator device into a wellbore having one or more perforation channels defined therein, the underbalance pressure generator device including a housing defining a piston chamber that extends between a first end and a second end of the housing and a piston movably arranged within the piston chamber, introducing hydraulic fluid into the piston chamber via a hydraulic fluid port defined at the first end of the housing and thereby moving the piston toward the second end, securing the piston at or near the second end of the housing with a first locking mechanism, evacuating the hydraulic fluid from the piston chamber via the hydraulic fluid port and thereby generating a pressure differential across the piston and between the piston chamber and an exterior of the housing, actuating the first locking mechanism to release the piston within the piston chamber and thereby creating a first pressure underbalance in the wellbore annulus that draws wellbore fluids into the piston chamber via one or more influx ports defined in the housing at or near the second end, and drawing scale and debris out of the one or more perforation channels as the wellbore fluids are drawn into the piston chamber.

Each of embodiments A, B, and C may have one or more of the following additional elements in any combination: Element 1: wherein the housing defines a hydraulic fluid port at or near the first end, the hydraulic fluid port being configured to inject hydraulic fluid into the piston chamber and thereby move the piston toward the second end. Element 2: wherein the hydraulic fluid is evacuated from the piston chamber via the hydraulic fluid port in order to generate a pressure differential across the piston and between the piston chamber and the exterior of the housing. Element 3: further comprising a control line communicably coupled to the locking mechanism, wherein the locking mechanism is one of a mechanical, electromechanical, hydraulic, or pneumatic locking mechanism. Element 4: further comprising one or more sensors communicably coupled to the control line and configured to determine depth of the device, and a control module communicably coupled to the control line and the one or more sensors and configured to communicate the depth of the device to a surface location. Element 5: wherein the control module is configured to operate the locking mechanism. Element 6: further comprising a computer arranged at the surface location and communicably coupled to at least one of the one or more sensors, the control module, and the locking mechanism via the control line. Element 7: wherein the one or more influx ports comprises at least one of an axial influx port and a radial influx port.

Element 8: further comprising a control line communicably coupled to the locking mechanism, wherein the locking mechanism is one of a mechanical, electromechanical, hydraulic, or pneumatic locking mechanism. Element 9: further comprising one or more sensors communicably coupled to the control line and configured to determine depth of the underbalance pressure generator device, and a control module communicably coupled the control line and the one or more sensors and configured to communicate the depth of the underbalance pressure generator device to a surface location. Element 10: wherein the control module is configured to operate the locking mechanism. Element 11: further comprising a computer arranged at the surface location and communicably coupled to at least one of the one or more sensors, the control module, and the locking mechanism via the control line. Element 12: wherein the housing defines a hydraulic fluid port at or near the first end, the hydraulic fluid port being configured to inject hydraulic fluid into the piston chamber and thereby move the piston toward the second end. Element 13: wherein the hydraulic fluid is evacuated from the piston chamber via the hydraulic fluid port in order to generate a pressure differential across the piston and between the piston chamber and the exterior of the housing. Element 14: wherein the at least one underbalance pressure generator device includes a first underbalance pressure generator device and a second underbalance pressure generator device operatively coupled to the first underbalance pressure generator device. Element 15: wherein at least one of the housing and the piston chamber of the first underbalance pressure generator device is different in length from a corresponding housing and piston chamber of the second underbalance pressure generator device. Element 16: further comprising first and second wellbore isolation devices arranged at opposing ends of the at least one underbalance pressure generator device.

Element 17: wherein introducing the hydraulic fluid into the piston chamber, securing the piston at or near the second end of the housing, and evacuating the hydraulic fluid from the piston chamber precedes conveying the underbalance pressure generator device into the wellbore. Element 18: wherein the underbalance pressure generator device comprises a first underbalance pressure generator device and a second underbalance pressure generator device operatively coupled to the first underbalance pressure generator device, the method further comprising actuating a second locking mechanism of the second underbalance pressure generator device following actuation of the first locking mechanism of the first underbalance pressure generator device and thereby creating a second pressure underbalance in the wellbore annulus, and generating a second pressure underbalance in the wellbore annulus adjacent the second underbalance pressure generator device after generating the first pressure differential in the wellbore annulus adjacent the first underbalance pressure generator device. Element 19: wherein actuating the locking mechanism comprises sending one or more control signals from a computer arranged at a surface location to a control module, and operating the locking mechanism with the control module based on receipt of the one or more control signals. Element 20: further comprising actuating first and second wellbore isolation devices arranged at opposing ends of the underbalance pressure generator device.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. An underbalance pressure generator device, comprising:
   a housing having a first end, a second end, and defining a piston chamber that extends between the first and second ends, the housing further providing a hydraulic fluid port at or near the first end;
   a piston movably arranged within the piston chamber and movable toward the second end upon injection of a hydraulic fluid into the piston chamber via the hydraulic fluid port;
   one or more influx ports defined in the housing at or near the second end to enable fluid communication between the piston chamber and an exterior of the housing; and
   a locking mechanism arranged at or near the second end to secure the piston at or near the second end,
   wherein a pressure differential is generated across the piston and between the piston chamber and the exterior of the housing by evacuating the hydraulic fluid from the piston chamber via the hydraulic fluid port, and
   wherein the locking mechanism is actuatable to release the piston to move toward the first end, which creates a pressure underbalance that draws fluids from the exterior of the housing into the piston chamber via the one or more influx ports.

2. The device of claim 1, further comprising a control line communicably coupled to the locking mechanism, wherein the locking mechanism is one of a mechanical, electromechanical, hydraulic, or pneumatic locking mechanism.

3. The device of claim 2, further comprising:
   one or more sensors communicably coupled to the control line and configured to determine depth of the device; and
   a control module communicably coupled to the control line and the one or more sensors and configured to communicate the depth of the device to a surface location.

4. The device of claim 3, wherein the control module is configured to operate the locking mechanism.

5. The device of claim 3, further comprising a computer arranged at the surface location and communicably coupled to at least one of the one or more sensors, the control module, and the locking mechanism via the control line.

6. The device of claim 1, wherein the one or more influx ports comprises at least one of an axial influx port and a radial influx port.

7. A system, comprising:
   a wellbore drilled into a subterranean formation and having one or more perforation channels defined therein;
   one an underbalance pressure generator device extendable into the wellbore and comprising:
      a housing defining a piston chamber that extends between a first end and a second end of the housing, the housing further providing a hydraulic fluid port at or near the first end;
      a piston movably arranged within the piston chamber and movable toward the second end upon injection of a hydraulic fluid into the piston chamber via the hydraulic fluid port;
      one or more influx ports are defined in the housing at or near the second end to enable fluid communication between the piston chamber and an exterior of the housing; and
      a locking mechanism arranged at or near the second end of the housing to secure the piston at or near the second end, wherein a pressure differential is generated across the piston chamber and between the piston chamber and the exterior of the housing by evacuating the hydraulic fluid from the piston chamber via the hydraulic fluid port, and wherein the locking mechanism is actuatable to release the piston to move toward the first end, which creates a pressure underbalance that draws fluids from the wellbore into the piston chamber via the one or more influx ports.

8. The system of claim 7, further comprising a control line communicably coupled to the locking mechanism, wherein the locking mechanism is one of a mechanical, electromechanical, hydraulic, or pneumatic locking mechanism.

9. The system of claim 8, further comprising:
one or more sensors communicably coupled to the control line and configured to determine depth of the underbalance pressure generator device; and
a control module communicably coupled the control line and the one or more sensors and configured to communicate the depth of the underbalance pressure generator device to a surface location.

10. The system of claim 9, wherein the control module is configured to operate the locking mechanism.

11. The system of claim 9, further comprising a computer arranged at the surface location and communicably coupled to at least one of the one or more sensors, the control module, and the locking mechanism via the control line.

12. The system of claim 7, wherein the underbalance pressure generator device comprises a first underbalance pressure generator device and the system further comprises a second underbalance pressure generator device operatively coupled to the first underbalance pressure generator device.

13. The system of claim 12, wherein at least one of the housing and the piston chamber of the first underbalance pressure generator device is different in length from a corresponding housing and piston chamber of the second underbalance pressure generator device.

14. The system of claim 7, further comprising first and second wellbore isolation devices arranged at opposing ends of the at least one underbalance pressure generator device.

15. A method comprising:
conveying an underbalance pressure generator device into a wellbore having one or more perforation channels defined therein, the underbalance pressure generator device including a housing defining a piston chamber that extends between a first end and a second end of the housing and a piston movably arranged within the piston chamber;
introducing hydraulic fluid into the piston chamber via a hydraulic fluid port defined at the first end of the housing and thereby moving the piston toward the second end;
securing the piston at or near the second end of the housing with a first locking mechanism;
evacuating the hydraulic fluid from the piston chamber via the hydraulic fluid port and thereby generating a pressure differential across the piston and between the piston chamber and an exterior of the housing;
actuating the first locking mechanism to release the piston within the piston chamber and thereby creating a first pressure underbalance in the wellbore annulus that draws wellbore fluids into the piston chamber via one or more influx ports defined in the housing at or near the second end; and
drawing scale and debris out of the one or more perforation channels as the wellbore fluids are drawn into the piston chamber.

16. The method of claim 15, wherein introducing the hydraulic fluid into the piston chamber, securing the piston at or near the second end of the housing, and evacuating the hydraulic fluid from the piston chamber precedes conveying the underbalance pressure generator device into the wellbore.

17. The method of claim 15, wherein the underbalance pressure generator device comprises a first underbalance pressure generator device and a second underbalance pressure generator device operatively coupled to the first underbalance pressure generator device, the method further comprising:
actuating a second locking mechanism of the second underbalance pressure generator device following actuation of the first locking mechanism of the first underbalance pressure generator device and thereby creating a second pressure underbalance in the wellbore annulus; and
generating a second pressure underbalance in the wellbore annulus adjacent the second underbalance pressure generator device after generating the first pressure differential in the wellbore annulus adjacent the first underbalance pressure generator device.

18. The method of claim 15, wherein actuating the locking mechanism comprises:
sending one or more control signals from a computer arranged at a surface location to a control module; and
operating the locking mechanism with the control module based on receipt of the one or more control signals.

19. The method of claim 15, further comprising actuating first and second wellbore isolation devices arranged at opposing ends of the underbalance pressure generator device.

* * * * *

UNITED STATES PATENT AND TRADEMARK OFFICE
CERTIFICATE OF CORRECTION

PATENT NO. : 9,605,514 B2  
APPLICATION NO. : 14/380727  
DATED : March 28, 2017  
INVENTOR(S) : Mark S. Holly et al.

Page 1 of 1

It is certified that error appears in the above-identified patent and that said Letters Patent is hereby corrected as shown below:

In the Claims

In Column 14, Line 51:
Replace "one an underbalance", with --an underbalance--.

Signed and Sealed this
Sixth Day of June, 2017

Michelle K. Lee
*Director of the United States Patent and Trademark Office*